US011146315B2

(12) United States Patent
Sitaram et al.

(10) Patent No.: US 11,146,315 B2
(45) Date of Patent: Oct. 12, 2021

(54) MULTI-USER MULTIPLE INPUT MULTIPLE OUTPUT (MU-MIMO) USER EQUIPMENT (UE) GROUPING WITH GEOGRAPHIC CORRELATION FACTORS

(71) Applicant: T-MOBILE INNOVATIONS LLC, Overland Park, KS (US)

(72) Inventors: Krishna D. Sitaram, Chantilly, VA (US); Hemanth Balaji Pawar, Brambleton, VA (US); Shilpa Kowdley Srinivas, Brambleton, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/943,306

(22) Filed: Jul. 30, 2020

(65) Prior Publication Data

US 2020/0403662 A1   Dec. 24, 2020

Related U.S. Application Data

(63) Continuation of application No. 16/450,018, filed on Jun. 24, 2019, now Pat. No. 10,771,128.

(51) Int. Cl.
*H04L 1/02* (2006.01)
*H04B 7/0452* (2017.01)
*H04W 64/00* (2009.01)

(52) U.S. Cl.
CPC ........ *H04B 7/0452* (2013.01); *H04W 64/006* (2013.01)

(58) Field of Classification Search
CPC ....... H04L 1/0618; H04L 1/06; H04L 5/0048; H04L 25/0202; H04B 7/047;
(Continued)

(56) References Cited

U.S. PATENT DOCUMENTS 8,059,609 B2   11/2011   Kim et al.
8,385,310 B2    2/2013   Hottinen et al.
(Continued)

FOREIGN PATENT DOCUMENTS

CN   101222267 A    7/2008
CN   101919200 B   12/2010
(Continued)

*Primary Examiner* — Khai Tran (57) ABSTRACT

A wireless communication network configured to share a wireless resource block that comprises a same time interval and a same radio subcarrier. The wireless communication network comprises network circuitry and transceiver circuitry. The network circuitry determines UE locations and determines UE correlation factors between the UEs based on the UE locations. The network circuitry associates the UE correlation factors with Three-Dimensional (3D) geographic containers based on the first UE locations and generates container correlation factors for the Three-Dimensional (3D) geographic containers responsive to the associations. The network circuitry selects UEs for the shared wireless resource block. The transceiver circuitry wirelessly transfers user data to the selected UEs over the shared wireless resource block that comprises the same time interval and the same radio subcarrier.

20 Claims, 8 Drawing Sheets

(58) Field of Classification Search
CPC ............ H04B 7/0456; H04W 72/0466; H04W 72/042; H04W 28/048
USPC .................................................. 375/267, 260
See application file for complete search history.

(56) References Cited

U.S. PATENT DOCUMENTS

| | | |
|---|---|---|
| 8,520,616 B2 | 8/2013 | Cui et al. |
| 8,644,180 B2 | 2/2014 | Prasad et al. |
| 8,644,422 B2 | 2/2014 | Gao et al. |
| 8,731,599 B2 | 5/2014 | Wei |
| 8,750,358 B2 | 6/2014 | Yue et al. |
| 8,914,015 B2 | 12/2014 | Kim et al. |
| 9,059,818 B2 | 6/2015 | Chung et al. |
| 9,392,607 B2 | 7/2016 | Huang et al. |
| 9,755,705 B2 | 9/2017 | Hou et al. |
| 2017/0099577 A1* | 4/2017 | Yocam .................. H04W 4/021 |
| 2018/0132096 A1 | 5/2018 | Huo |
| 2018/0294827 A1 | 10/2018 | Abdelmonem |
| 2019/0141480 A1* | 5/2019 | Tung .................... H04W 4/027 |
| 2019/0141482 A1* | 5/2019 | Edge ..................... H04W 36/14 |
| 2019/0166508 A1 | 5/2019 | Friday et al. |
| 2019/0182614 A1* | 6/2019 | Monogioudis ........ G01S 5/0294 |
| 2019/0189001 A1 | 6/2019 | Smothers et al. |
| 2019/0281576 A1* | 9/2019 | Marten ............... H04W 64/003 |
| 2020/0177686 A1* | 6/2020 | Kalis ....................... H04L 51/32 |

FOREIGN PATENT DOCUMENTS

| | | |
|---|---|---|
| CN | 105472754 A | 4/2016 |
| WO | 2009083783 A1 | 7/2009 |
| WO | 2012065278 A1 | 5/2012 |

* cited by examiner

MULTI-USER MULTIPLE INPUT MULTIPLE OUTPUT (MU-MIMO) USER EQUIPMENT (UE) GROUPING WITH GEOGRAPHIC CORRELATION FACTORS

RELATED APPLICATION

This UNITED STATES PATENT APPLICATION is a continuation of U.S. patent application Ser. No. 16/450,018 that was filed on Jun. 24, 2019 and is entitled "MULTI-USER MULTIPLE INPUT MULTIPLE OUTPUT (MU-MIMO) USER EQUIPMENT (UE) GROUPING WITH GEOGRAPHIC CORRELATION FACTORS."

U.S. patent application Ser. No. 16/450,018 is hereby incorporated by reference into this UNITED STATES PATENT APPLICATION.

TECHNICAL BACKGROUND

Wireless communication networks provide wireless data services to wireless user devices. Exemplary wireless data services include voice-calling, internet-access, and machine communications. Exemplary wireless user devices comprise phones, computers, drones, and robots. The wireless communication networks have wireless access nodes that exchange wireless signals with the wireless user devices. The wireless signals transport user data and network signaling. The wireless access nodes exchange the user data and network signaling with other network elements to help deliver the wireless data services. Exemplary wireless communication networks include Fifth Generation New Radio (5GNR) networks and Long Term Evolution (LTE) networks.

The wireless communication networks use a technology called Multi-User Multiple Input Multiple Output (MU-MIMO). With MU-MIMO, a wireless access node uses the same time and frequency resources for groups of the wireless user devices. Thus, a group of the wireless user devices shares the same resource blocks using MU-MIMO. Sharing time and frequency resources using MU-MIMO can dramatically improve the spectral efficiency of the wireless communication networks.

To share time and frequency resources using MU-MIMO, the wireless access nodes and the wireless user devices use beamforming and signal processing to separate the individual user signals in the shared resource blocks. For successful MU-MIMO reception, the wireless user devices should have a small MU-MIMO correlation factor. The MU-MIMO correlation factor predicts the likely beam interference for a group of wireless user devices sharing resource blocks. A group of wireless user devices that are close to one another have a high MU-MIMO correlation factor because their beams are so close. A group of wireless user devices that are distant from one another have a low MU-MIMO correlation factor because their beams are separated—especially when there is a large angle at the wireless access node between the wireless user devices.

The wireless access points execute Physical Layer (PHY) software to process Sounding Reference Signals (SRS) from the wireless user devices and determine received signal strength, Angle-of-Arrival (AoA), and other radio metrics. The wireless access nodes execute Media Access Control (MAC) software to process the signal strength, AoA, and other radio metrics to determine the MU-MIMO correlation factors between the wireless user devices. If the MU-MIMO correlation factor between a group of wireless user devices is low enough, then the MAC schedules the group of wireless user devices to receive MU-MIMO transmissions over shared resource blocks.

Unfortunately, the calculation of the MU-MIMO correlation factors for the wireless user devices is a heavy burden on the processing resources of the wireless access nodes.

TECHNICAL OVERVIEW

A wireless communication network configured to share a wireless resource block that comprises a same time interval and a same radio subcarrier. The wireless communication network comprises network circuitry and transceiver circuitry. The network circuitry, for a first set of User Equipment (UEs), determines first UE locations, determines UE correlation factors between the first set of the UEs based on the first UE locations, and associates the UE correlation factors with Three-Dimensional (3D) geographic containers based on the first UE locations. The network circuitry generates container correlation factors for the Three-Dimensional (3D) geographic containers responsive to the associations. For a second set of UEs, the network circuitry determines second UE locations, identifies the 3D geographic containers for the second set of the UEs based on the second UE locations, and determines the container correlation factors for the identified 3D geographic containers. The network circuitry selects some of the second set of the UEs for the shared wireless resource block based on the container correlation factors for the identified 3D geographic containers. The transceiver circuitry wirelessly transfers user data to the selected ones of the second set of the UEs over the shared wireless resource block that comprises the same time interval and the same radio subcarrier.

DETAILED DESCRIPTION

Figure 1:
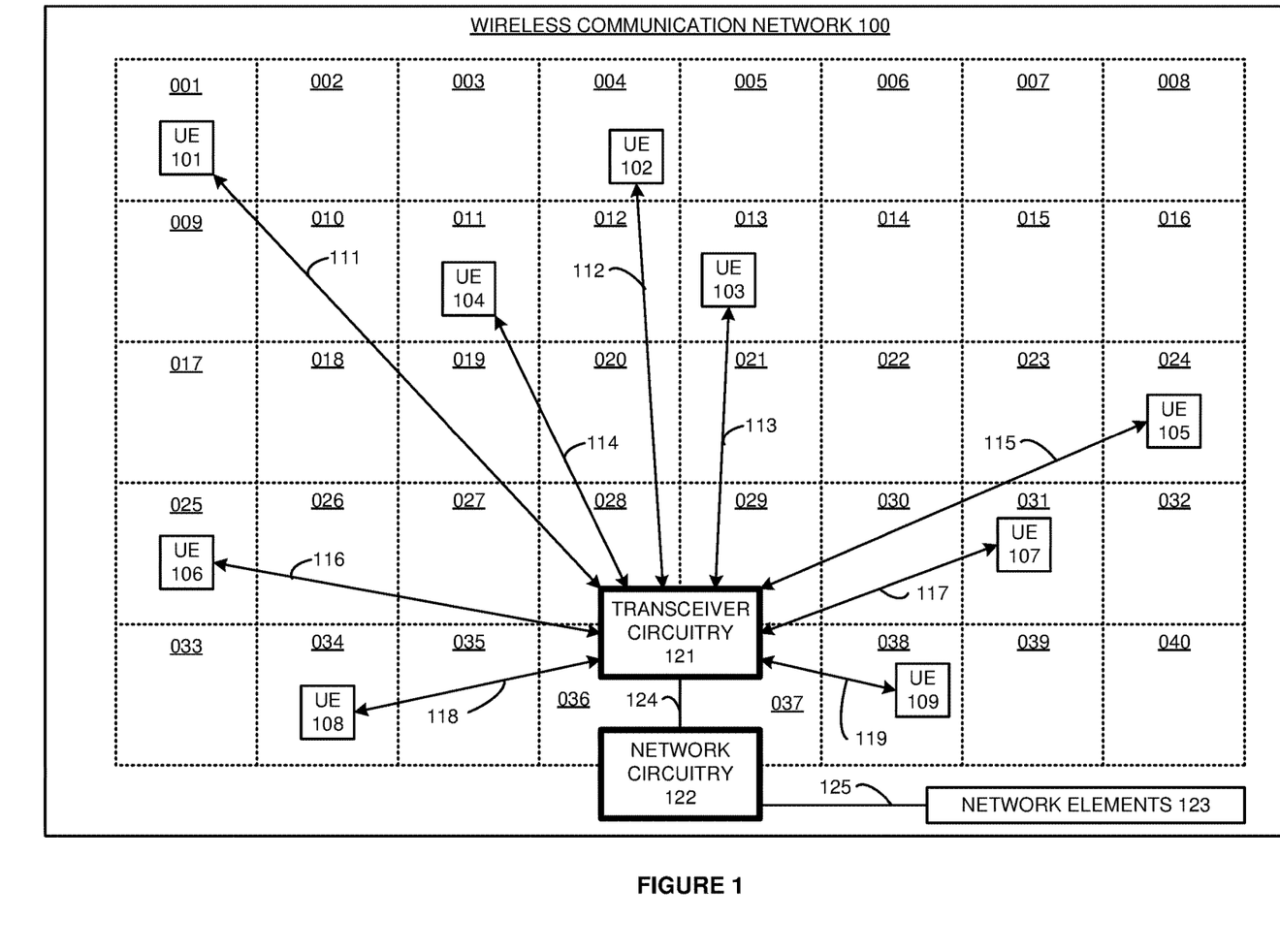
FIG. 1 illustrates a wireless communication network to serve User Equipment (UEs) using Multi-User Multiple Input Multiple Output (MU-MIMO).

FIG. 1 illustrates a wireless communication network 100 to serve User Equipment (UEs) 101-109 using Multi-User Multiple Input Multiple Output (MU-MIMO). Wireless communication network 100 comprises UEs 101-109, transceiver circuitry 121, network circuitry 122, and network elements 123. UEs 101-109 and transceiver circuitry 121 are coupled over respective wireless links 111-119. Transceiver circuitry 121 and network circuitry 122 are coupled over data links 124. Network circuitry 122 and network elements 123 are coupled over data links 125. UEs 101-109 are located in a geographic area or volume that is separated into geographic containers 001-040. In some examples, geographic containers 001-040 comprise two-dimensional areas that are each smaller than 100 meters by 100 meters. For clarity, the number of UEs, circuitries, and geographic containers has been restricted on FIG. 1, and wireless communication network 100 typically includes many more UEs, circuitries, and geographic containers than the amount shown.

Wireless communication network 100 serves UEs 101-109 with wireless data services like media-streaming, social-networking, machine communications, or some other user application. UEs 101-109 comprise phones, computers, robots, vehicles, sensors, or some other apparatus with communication circuitry. Network elements 123 comprise Access and Mobility Management Function (AMF), User Plane Functions (UPF), Mobility Management Entity (MME), Serving Gateway (SGW), or some other computer systems with networking software.

Transceiver circuitry 121 comprises antennas, modulators, amplifiers, filters, digital/analog interfaces, microprocessors, memory, and bus connections. Network circuitry 122 comprises microprocessors, memory, user interfaces, and bus connections. In circuitry 121-122, the microprocessors comprise Digital Signal Processors (DSPs), Central Processing Units (CPUs), Graphical Processing Units (GPUs), Field Programmable Gate Arrays (FPGAs), Application-Specific Integrated Circuits (ASICs), and/or the like. The memories comprise Random Access Memory (RAM), flash circuitry, disc drives, and/or the like. The memories store operating systems and network applications. The microprocessors execute the operating systems and network applications to wirelessly exchange network signaling and user data with UEs 101-109 over wireless links 111-119 and to exchange network signaling and user data with network elements 123 over data links 125. Exemplary network applications comprise Physical Layer (PHY), Media Access Control (MAC), Radio Link Control (RLC), Packet Data Convergence Protocol (PDCP), Radio Resource Control (RRC), Service Data Adaptation Protocol (SDAP), and Common Public Radio Interface (CPRI).

Network circuitry 122 stores geographic data that indicates geographic containers 001-040. The geographic data could be latitude/longitude or some other geofence parameters. Transceiver circuitry 121 wirelessly receives network signaling from UEs 101-109 that are located in geographic containers 001-040. Transceiver circuitry 121 transfers the network signaling to network circuitry 122 over data links 124. Network circuitry 122 processes the network signaling to determine UE MU-MIMO correlation factors between UEs 101-109. For example, network circuitry 122 may process Sounding Reference Signals (SRS) from UEs 104-105 to determine signal strength, Angle-of-Arrival (AoA), and/or other radio metrics. Network circuitry 122 then processes the signal strength, AoA, and/or the other radio metrics to determine the UE MU-MIMO correlation factor between UEs 104-105. If the UE MU-MIMO correlation factor between UEs 104-105 is low enough, then network circuitry 122 may pair UEs 104-105 to receive MU-MIMO transmissions from transceiver circuitry 121.

Network circuitry 122 processes the network signaling to associate the UE MU-MIMO correlation factors with geographic containers 001-040. Network circuitry 122 locates UEs 101-109 by radio triangulation, UE location reports, and/or the like. Network circuitry 122 uses the UE locations to associate the UE MU-MIMO correlation factors to the geographic containers where the UEs are located. For example, Network circuitry 122 associates the UE MU-MIMO correlation factor between UEs 104-105 with geographic containers 011 and 024 that contain UEs 104-105.

Network circuitry 122 processes the UE MU-MIMO correlation factors associated with geographic containers 001-020 to determine container MU-MIMO correlation factors between geographic containers 001-020. For example, network circuitry 122 may average all of the UE MU-MIMO correlation factors between geographic containers 011 and 024 to determine a single container MU-MIMO correlation factor for geographic containers 011 and 024. Container MU-MIMO correlation factors for other groups of geographic containers 001-040 are developed in the same manner.

Network circuitry 122 selects groups of UEs 101-109 for MU-MIMO based on their container MU-MIMO correlation factors. For example, network circuitry 122 may select UEs 108-109 for MU-MIMO based on the container MU-MIMO correlation factor for containers 034 and 038. Network circuitry 122 directs transceiver circuitry 121 to wirelessly transfer MU-MIMO signals to these selected groups of UEs 101-109. Transceiver circuitry 121 wirelessly transfers MU-MIMO signals to the selected groups of UEs 101-109. The MU-MIMO signals to a particular group of UEs will use the same time and frequency resource blocks. For a MU-MIMO group comprising UE 101 and UE 105, UE 101 and UE 105 would share individual downlink resource blocks.

The number of UE MU-MIMO correlation factors that are used to determine a single container MU-MIMO correlation factor is referred to as the sample size for that container MU-MIMO correlation factor. In some examples, network circuitry 122 continuously determines new UE MU-MIMO correlation factors, new container MU-MIMO correlation factors, and new samples sizes for the groups of the geographic containers. Network circuitry 122 may then use the container MIMO correlation factors when their sample sizes are large enough—above a threshold. Network circuitry 122 does not use the container MIMO correlation factors that have low sample sizes—below the threshold. Network circuitry 122 would use the UE MU-MIMO correlation factors to select UEs for MU-MIMO when the container MU-MIMO correlation factors do not have adequate sample sizes.

Advantageously, network circuitry 122 calculates the container MU-MIMO correlation factors to relive the heavy processing burden caused by the repeated calculation of UE MU-MIMO correlation factors.

Figure 2:
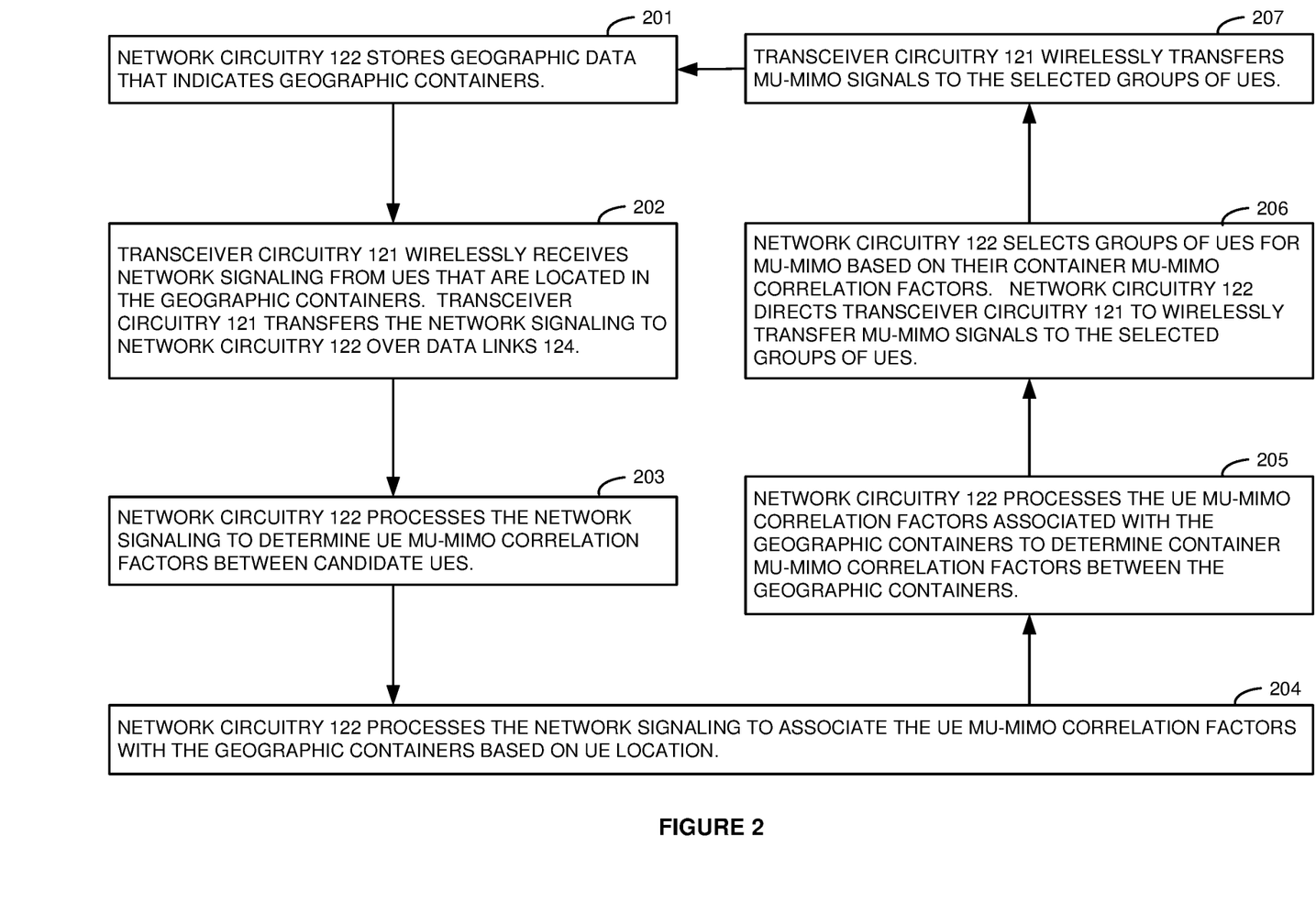
FIG. 2 illustrates the operation of the wireless communication network to serve the UEs using MU-MIMO.

FIG. 2 illustrates the operation of wireless communication network 100 to serve UEs using MU-MIMO. Network circuitry 122 stores geographic data that indicates geographic containers (201). Transceiver circuitry 121 wirelessly receives network signaling from UEs that are located in the geographic containers (202). Transceiver circuitry 121 transfers the network signaling to network circuitry 122 (202). Network circuitry 122 processes the network signaling to determine UE MU-MIMO correlation factors between candidate UEs (203). Network circuitry 122 uses the UE MU-MIMO correlation factors to pair candidate UEs for MU-MIMO reception over shared time and frequency resources. Network circuitry 122 processes the network signaling to associate the UE MU-MIMO correlation factors with the geographic containers (204). Network circuitry 122 processes the UE MU-MIMO correlation factors associated with the geographic containers to determine container MU-MIMO correlation factors between the geographic containers (205). Network circuitry 122 selects groups of the UEs for MU-MIMO based on their container MU-MIMO correlation factors (206). Network circuitry 122 directs transceiver circuitry 121 to wirelessly transfer MU-MIMO signals to the selected groups of UEs (206). Transceiver circuitry 121 wirelessly transfers MU-MIMO signals to the selected groups of UEs over shared time and frequency resources (207).

Figure 3:
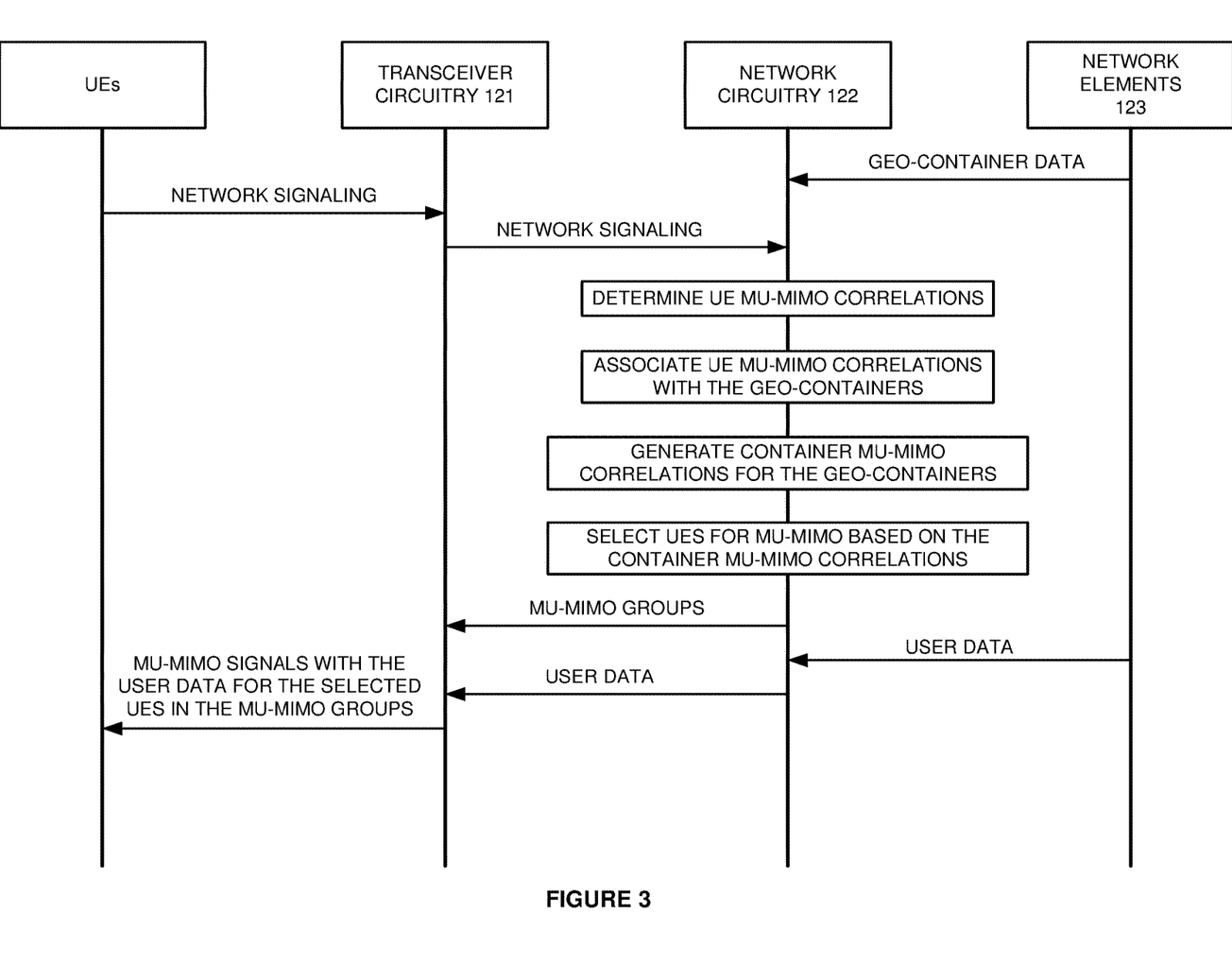
FIG. 3 illustrates the operation of the wireless communication network to serve the UEs using MU-MIMO.

FIG. 3 illustrates the operation of wireless communication network 100 to serve UEs 101-109 using MU-MIMO. Network circuitry 122 receives geographic data that indicates geographic containers from a provisioning system in network elements 123. Transceiver circuitry 121 wirelessly receives network signaling from UEs that are located in the geographic containers. Transceiver circuitry 121 transfers the network signaling to network circuitry 122. Network circuitry 122 processes the network signaling to determine UE MU-MIMO correlation factors between candidate UEs. Network circuitry 122 processes the network signaling to associate the UE MU-MIMO correlation factors with the geographic containers.

Network circuitry 122 processes the UE MU-MIMO correlation factors associated with the geographic containers to generate container MU-MIMO correlation factors for groups of the geographic containers. Network circuitry 122 selects groups of UEs for MU-MIMO based on their container MU-MIMO correlation factors. Network circuitry 122 indicates the selected UEs in the MU-MIMO groups to transceiver circuitry 121. Network circuitry 122 receives user data for the selected UEs in the MU-MIMO groups and transfers the user data to transceiver circuitry 121. Transceiver circuitry 121 wirelessly transfers MU-MIMO signals that transport the user data to the selected UEs in the MU-MIMO UE groups.

Figure 4:
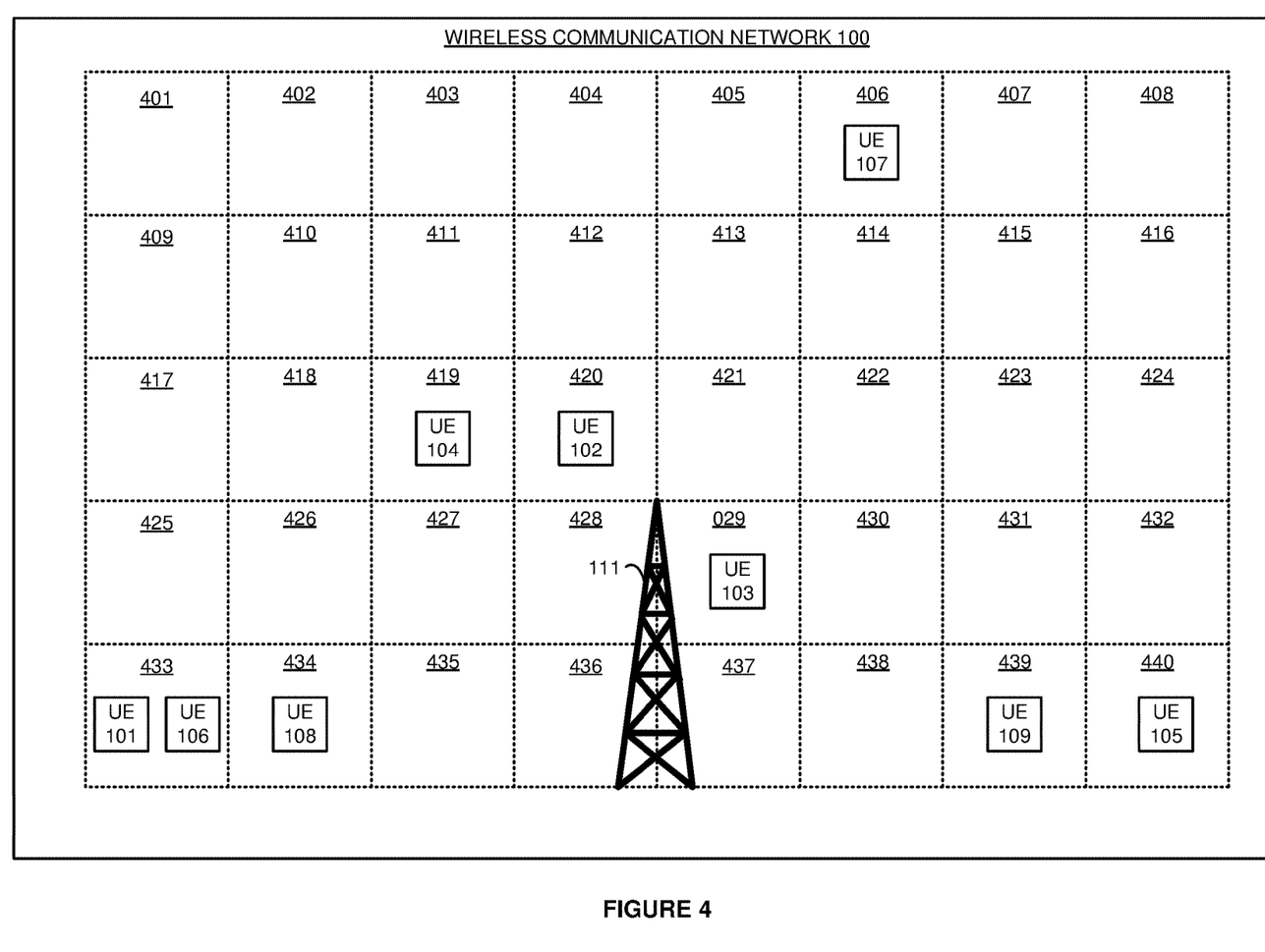
FIG. 4 illustrates the wireless communication network that serves UEs using MU-MIMO.

FIG. 4 illustrates wireless communication network 100 that serves UEs 101-109 using MU-MIMO. Note that the view of FIG. 4 is an elevation view where the earth's surface runs across the bottom of FIG. 4 (the view of FIG. 1 is a plan view looking down at the earth's surface from above). On FIG. 4, wireless communication network 100 uses three-dimensional geographic containers, although two-dimensional geographic containers could be used in other examples. For clarity, wireless links 111-119, network circuitry 122, network elements 123, and data links 124-125 are omitted from FIG. 4. Transceiver circuitry 111 is depicted as a tower on FIG. 4.

On FIG. 4, UEs 101-109 are located in a geographic volume that is separated into geographic containers 401-440. By combining FIGS. 1 and 4, the geographic containers 101-040 and 401-440 become three-dimensional boxes. For example, UE 104 is located in the geographic container 011/419. UE 105 is located in the geographic container 024/440. In some examples, the geographic containers each comprise a three-dimensional volume that is smaller than 100 meters by 100 meters by 100 meters.

Network circuitry 122 stores geographic data that indicates geographic containers 001/401-040/440. Network circuitry 122 processes the network signaling to determine UE MU-MIMO correlation factors between UEs 101-109. Network circuitry 122 processes the network signaling to associate the UE MU-MIMO correlation factors with geographic containers 001/401-040/440. For example, Network circuitry 122 associates the UE MU-MIMO correlation factor between UEs 104-105 with three-dimensional geographic containers 011/419 and 024/440 that contain UEs 104-105.

Network circuitry 122 processes the UE MU-MIMO correlation factors associated with geographic containers 001/401-040/440 to determine container MU-MIMO correlation factors between geographic containers 001/401-040/440. For example, network circuitry 122 may average all of the UE MU-MIMO correlation factors for geographic containers 011/419 and 024/440 to determine a single container MU-MIMO correlation factor for three-dimensional geographic containers 011/419 and 024/440. Container MU-MIMO correlation factors for other groups of three-dimensional geographic containers are developed in the same manner. Network circuitry 122 selects groups of UEs for MU-MIMO based on their three-dimensional container MU-MIMO correlation factors. Transceiver circuitry 121 wirelessly transfers MU-MIMO signals to the selected groups of UEs 101-109 in the MU-MIMO groups.

Figure 5:
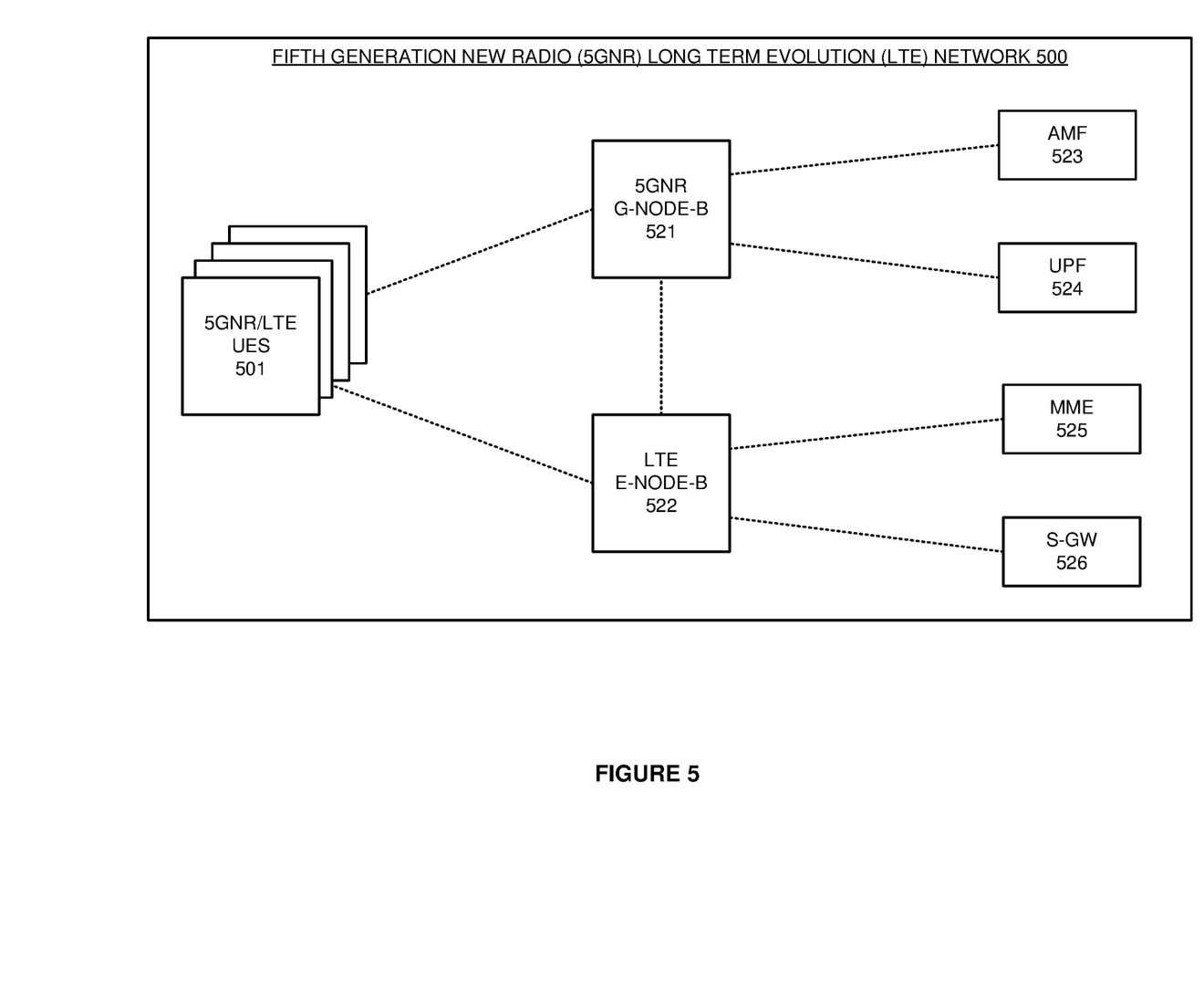
FIG. 5 illustrates a Fifth Generation New Radio (5GNR) Long Term Evolution (LTE) communication network to serve 5GNR/LTE UEs using MU-MIMO.

FIG. 5 illustrates Fifth Generation New Radio (5GNR) Long Term Evolution (LTE) communication network 500 to serve 5GNR/LTE UEs using MU-MIMO. 5GNR/LTE network 500 is an example of wireless communication network 100, although network 100 may differ. 5GNR/LTE network 500 comprises 5GNR/LTE UEs 501, 5GNR gNodeB 521, LTE eNodeB 522, Access and Mobility Management Function (AMF) 523, User Plane Function (UPF) 524, Mobility Management Entity (MME) 525, and Serving Gateway (S-GW) 526. UEs 501 are coupled to 5GNR gNodeB 521 over a 5GNR link and to LTE eNodeB 522 over an LTE link. 5GNR gNodeB 521 and LTE eNodeB 522 are coupled by X2 links. 5GNR gNodeB 521 and AMF 523 are coupled over N2 links. 5GNR gNodeB 521 and UPF 524 are coupled over N3 links. LTE eNodeB 522 and MME 525 are coupled over S1-MME links. LTE eNodeB 522 and S-GW 422 are coupled over S1-U links.

5GNR gNodeB 521 receives geographic data from AMF 523 that indicates geographic containers. LTE eNodeB 522 receives geographic data from MME 525 (or gNodeB 521) that indicates the geographic containers. 5GNR gNodeB 521 wirelessly receives 5GNR signaling from 5GNR/LTE UEs 501. 5GNR gNodeB 521 processes the 5GNR signaling to determine 5GNR MU-MIMO correlation factors among UEs 501. LTE eNodeB 522 wirelessly receives LTE signaling from 5GNR/LTE UEs 501. LTE eNodeB 522 processes the LTE signaling to determine LTE MU-MIMO correlation factors among UEs 501. NodeBs 521-522 process the network signaling to associate their UE MU-MIMO correlation factors with the geographic containers.

5GNR gNodeB 521 processes the 5GNR UE MU-MIMO correlation factors to generate 5GNR container MU-MIMO correlation factors for groups of the geographic containers. LTE eNodeB 522 processes the LTE UE MU-MIMO correlation factors to generate LTE container MU-MIMO correlation factors for groups of the geographic containers. 5GNR gNodeB 521 selects groups of UEs 501 for 5GNR MU-MIMO based on their 5GNR container MU-MIMO correlation factors. LTE eNodeB 522 selects groups of UEs 501 for LTE MU-MIMO based on their LTE container MU-MIMO correlation factors. 5GNR gNodeB 521 transfers user data to 5GNR/LTE UEs 501 over 5GNR MU-MIMO signals. LTE eNodeB 522 transfers user data to 5GNR/LTE UEs 501 over LTE MU-MIMO signals.

Figure 6:
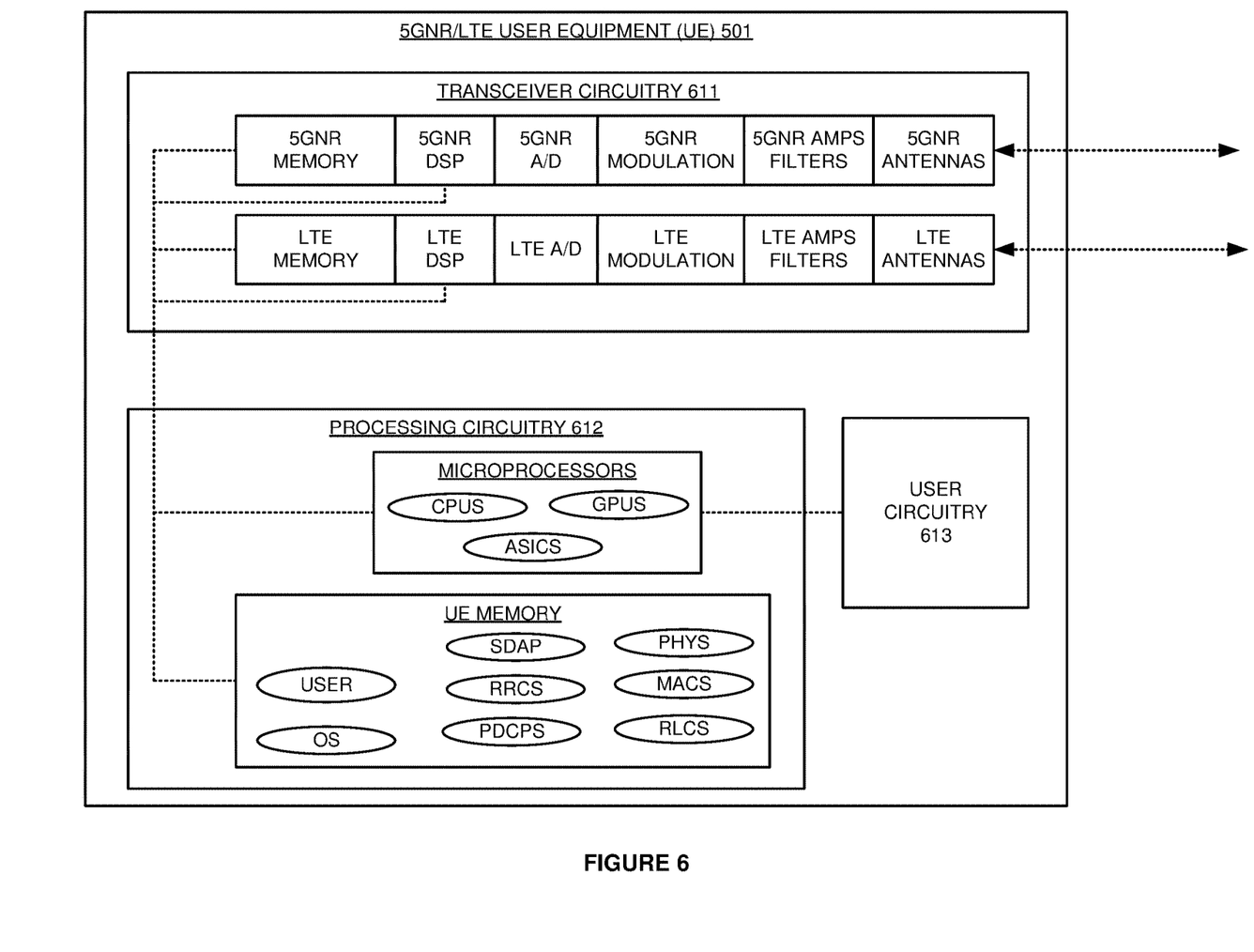
FIG. 6 illustrates a 5GNR/LTE UE that uses MU-MIMO.

FIG. 6 illustrates an exemplary one of 5GNR/LTE UEs 501 that uses MU-MIMO. 5GNR/LTE UE 501 is an example of UEs 101-109 although UEs 101-109 may differ. 5GNR/LTE UE 501 comprises transceiver circuitry 611, processing circuitry 612, and user circuitry 613 which are interconnected over bus circuitry. User circuitry 613 comprises graphic displays, machine controllers, sensors, cameras, transceivers, and/or some other user interface components. Transceiver circuitry 611 comprises radios for 5GNR and LTE. The radios each comprise antennas, amplifiers (AMPS), filters, modulation, analog/digital interfaces (A/D), Digital Signal Processors (DSP), and memory. The radios may share some of these components by using time diversity, frequency separation, and the like.

Processing circuitry 612 comprises microprocessors and UE memory. The microprocessors comprise CPUs, GPUs, ASICs, and/or some other computer circuitry. The UE memory comprises volatile and non-volatile data storage like RAM, flash, and/or disk. The UE memory stores an operating system (OS), user applications, and network applications for 5GNR and LTE. The network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP). The microprocessors execute the operating system, user applications, and network applications to exchange user data and network signaling with NodeBs 521-522.

The user applications store Uplink (UL) user data and signaling in the UE memory. The network applications process the UL user data/signaling and Downlink (DL) network signaling to generate UL network signaling. The network applications transfer the UL user data and network signaling to the memories in transceiver circuitry 611. In transceiver circuitry 611, the DSP processes the UL user data and network signaling to transfer corresponding digital UL signals to the A/D interfaces. The A/D interfaces convert the digital UL signals into analog UL signals for modulation. Modulation up-converts the analog UL signals to their carrier frequencies. The amplifiers boost the modulated UL signals for the filters which attenuate unwanted out-of-band energy. The filters transfer the UL signals through duplexers to the antennas. The electrical UL signals drive the antennas to emit corresponding wireless signals that transport the UL user data and network signaling to NodeBs 521-522.

In the transceiver circuitry 611, the antennas receive wireless signals that transport user data and network signaling from NodeBs 521-522. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The A/D interfaces convert the analog DL signals into digital DL signals for the DSPs. The DSPs recover DL data from the digital DL signals. The DSPs transfer the DL data to the UE memory. The microprocessors execute the network applications to process the DL data to recover the DL user data and network signaling. The microprocessors execute the network applications to store the DL user data and signaling in the UE memory. The user applications process their user data and signaling in the UE memory.

Figure 7:
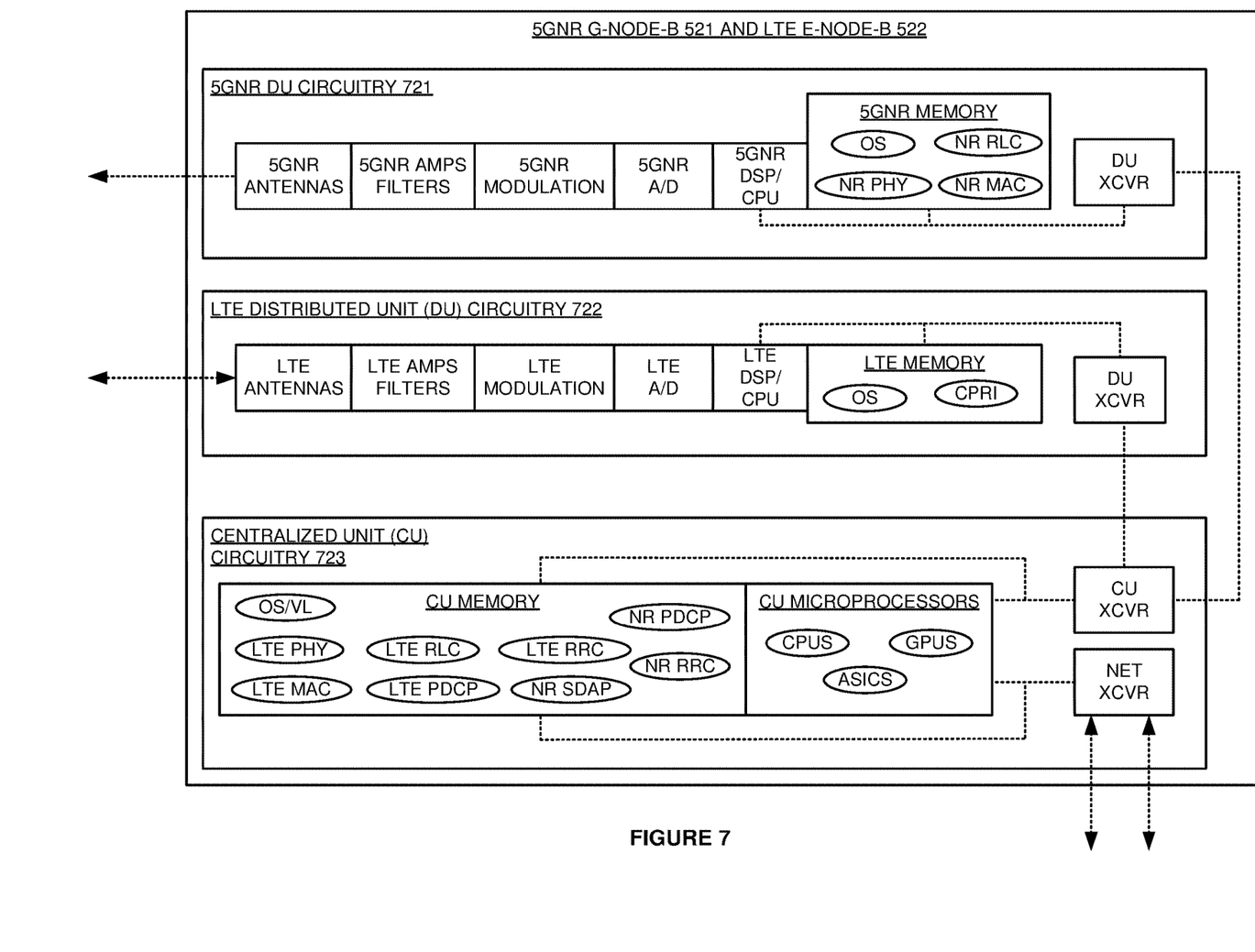
FIG. 7 illustrates a 5GNR gNodeB and an LTE eNodeB and that serve 5GNR/LTE UEs using MU-MIMO.

FIG. 7 illustrates 5GNR gNodeB 521 and LTE eNodeB 522 and that serve 5GNR/LTE UEs 501 using MU-MIMO. Node-Bs 521-522 comprise examples of circuitry 121-122, although circuitry 121-122 may differ. 5GNR gNodeB 521 comprises 5GNR Distributed Unit (DU) circuitry 721 and portions of Centralized Unit (CU) circuitry 723. LTE eNodeB 522 comprises LTE DU circuitry 722 and portions of CU circuitry 723. DU circuitry 721-722 each comprise antennas, amplifiers/filters, modulation, A/D, DSP/CPU, memory, and DU transceivers (XCVR) that are coupled over bus circuitry. CU circuitry 723 comprises CU microprocessors, CU memory, CU transceivers, and network (NET) transceivers that are coupled over bus circuitry.

The antennas in 5GNR circuitry 721 are coupled to 5GNR/LTE UEs 501 over wireless 5GNR links. The DU transceivers in 5GNR DU circuitry 721 are coupled to the CU transceivers in CU circuitry 723 over RLC/PDCP links. The network transceivers in CU circuitry 723 are coupled to AMF 523 over N2 links. The network transceivers in CU circuitry 723 are coupled to UPF 524 over N3 links. In 5GNR DU circuitry 721, the 5GNR memory stores an operating system and network applications for 5GNR PHY, MAC, and RLC.

The antennas in LTE DU circuitry 722 are coupled to 5GNR/LTE UEs 501 over wireless LTE links. The DU transceivers in LTE DU circuitry 722 are coupled to the CU transceivers in CU circuitry 723 over LTE Common Public Radio Interface (CPRI) links. The network transceivers in CU circuitry 723 are coupled to MME 525 over S1-MME links. The network transceivers in CU circuitry 723 are coupled to S-GW 526 over S1-U links. In LTE DU circuitry 722, the LTE memory stores an operating system and network applications for CPRI. In CU circuitry 723, the CU memory stores an operating system, virtual layer (VL) components, and network applications. The virtual layer components comprise hypervisor modules, virtual switches, virtual machines, and/or the like. The network applications include LTE PHY, LTE MAC, LTE RLC, LTE PDCP, LTE RRC, and 5GNR PDCP.

In this example, 5GNR DU circuitry 721 hosts the network applications for 5GNR PHY, 5GNR MAC, and 5GNR RLC. CU circuitry 723 hosts the network applications for 5GNR PDCP, 5GNR RRC, 5GNR SDAP, LTE PHY, LTE MAC, LTE RLC, LTE PDCP, and LTE RRC. In other examples, circuitry 721-723 may use other network application splits.

In 5GNR DU circuitry 721, the antennas receive wireless 5GNR signals from 5GNR/LTE UEs 501 that transport 5GNR SDAP data and RRC signaling. In LTE DU circuitry 722, the antennas receive wireless LTE signals from 5GNR/LTE UEs 501 that transport LTE RRC data and RRC signaling. In DU circuitry 721-722, the antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSPs. In 5GNR DU circuitry 721, the 5GNR DSPs recover UL 5GNR symbols from the digital UL 5GNR signals.

The 5GNR CPUs execute the 5GNR PHY, MAC, and RLC to process the UL 5GNR symbols to recover UL Protocol Data Units (PDUs) that carry SDAP data and RRC signaling. In particular, the 5GNR PHY processes UL Sounding Reference Signals (SRS) to determine UE MU-MIMO correlation factors and UE locations. The 5GNR MAC processes the UE MU-MIMO correlation factors and UE locations to associate the UE MU-MIMO correlation factors with geographic containers. The 5GNR MAC processes the UE MU-MIMO correlation factors for individual groups of geographic containers to determine container MU-MIMO correlation factors for the individual groups of geographic containers. The 5GNR MAC selects UEs for MU-MIMO based on the container MU-MIMO correlation factors. The DU transceivers in DU circuitry 721 transfer the UL 5GNR PDUs to the CU transceivers in CU circuitry 723 over the 5GNR RLC/PDCP links.

In CU circuitry 723, the CU microprocessors execute the 5GNR PDCP, RRC, and SDAP to recover the UL SDAP data and RRC signaling from the UL 5GNR PDUs. The CU microprocessors execute the 5GNR RRC to process UL RRC signaling and DL N2 signaling to generate UL N2 signaling. The CU microprocessors execute the 5GNR SDAP to process UL SDAP data to generate UL N3 data.

The network transceivers transfer the UL N2 signaling to AMF 523 over the N2 links. The network transceivers transfer the UL N3 data to UPF 524 over the N3 links.

In LTE DU circuitry 722, the LTE DSPs recover UL LTE symbols from the UL digital LTE signals. The LTE DSPs execute the LTE CPRI to format the UL LTE symbols for transmission. The DU transceivers transfer the UL LTE symbols to the CU transceivers in CU circuitry 723 over the CPRI links. In CU circuitry 723, the CU microprocessors execute the LTE PHY, MAC, RLC, PDCP, and RRC to recover the UL RRC data and RRC signaling from the UL LTE symbols. In particular, the LTE PHY processes UL SRS to determine UE MU-MIMO correlation factors and UE locations. The LTE MAC processes the UE MU-MIMO correlation factors and UE locations to associate the UE MU-MIMO correlation factors with geographic containers. The LTE MAC processes the UE MU-MIMO correlation factors for individual groups of geographic containers to determine container MU-MIMO correlation factors for the individual groups of geographic containers. The LTE MAC selects UEs for MU-MIMO based on the container MU-MIMO correlation factors. The CU microprocessors execute the LTE RRC to process UL RRC signaling and DL S1-MME signaling to generate UL S1-MME signaling and DL RRC signaling. The network transceivers transfer the UL S1-MME signaling to MME 525 over the S1-MME links. The network transceivers transfer the UL S1-U data to LTE-SGW 526 over the S1-U links.

In CU circuitry 723, the network transceivers receive DL N2 signaling from AMF 523 over the N2 links. The network transceivers receive DL N3 data from UPF 524 over the N3 links. The CU microprocessors execute the 5GNR RRC to process the UL RRC signaling and DL N2 signaling to generate DL RRC signaling. The CU microprocessors execute the 5GNR SDAP to process the DL N3 data to generate DL SDAP data. The CU microprocessors execute the 5GNR PDCP to process the DL RRC signaling and SDAP data to generate DL 5GNR PDUs. The CU transceivers transfer the DL 5GNR PDUs to 5GNR DU circuitry 721 over the RLC/PDCP links.

In CU circuitry 723, the network transceivers receive DL S1-MME signaling from MME 525 over the S1-MME links. The network transceivers receive DL S1-U data from S-GW 422 over the S1-U links. The CU microprocessors execute the LTE RRC to process the UL RRC signaling and DL S1-MME signaling to generate DL RRC signaling. The CU microprocessors execute the LTE PDCP, RLC, MAC, and PHY to process the DL RRC signaling and RRC data to generate DL LTE symbols. In particular the LTE MAC schedules the UE groups that were selected for MU-MIMO in the same resource blocks. The LTE PHY transfers the LTE MU-MIMO symbols for delivery to the UE groups that were selected for MU-MIMO in the same resource blocks. The CU transceivers transfer the DL LTE symbols to LTE DU circuitry 722 over the CPRI links.

In 5GNR DU circuitry 721, the 5GNR CPU executes the 5GNR RLC, MAC, and PHY to process the DL PDUs to generate DL 5GNR symbols. In particular the 5GNR MAC schedules UE groups that were selected for MU-MIMO in the same resource blocks. The 5GNR PHY transfers the 5GNR MU-MIMO symbols for delivery to the UE groups that were selected for MU-MIMO in the same resource blocks.

The 5GNR DSP processes the DL 5GNR symbols to generate corresponding digital DL signals for the 5GNR A/D. In LTE DU circuitry 722, the LTE CPU executes the LTE DSP to process the DL LTE symbols and generate corresponding digital DL signals for the LTE A/D. In DU circuitry 721-722, the A/Ds convert the digital DL signals into analog DL signals for modulation. Modulation up-converts the DL signals to their carrier frequencies. The amplifiers boost the modulated DL signals for the filters which attenuate unwanted out-of-band energy. The filters transfer the DL signals through duplexers to the antennas. The electrical DL signals drive the antennas to emit corresponding wireless LTE and 5GNR signals that transport the DL SDAP/RRC data and RRC signaling to 5GNR/LTE UEs 501.

In CU circuitry 723, the 5GNR SDAP maps between the N3 data and Service Data Units (SDUs). The 5GNR RRC maps between N2 signaling and SDUs. The 5GNR SDAP and RRC exchange their SDUs with the 5GNR PDCP. The 5GNR PDCP maps between the SDUs and Protocol Data Units (PDUs). The 5GNR PDCP exchange the 5GNR PDUs with the 5GNR RLC in 5GNR DU circuitry 721. In 5GNR DU circuitry 721, the 5GNR RLC maps between the PDUs from CU circuitry 723 and MAC logical channels. The 5GNR RLC exchanges the SDAP data and RRC signaling with the 5GNR MAC over the MAC logical channels. The 5GNR MAC maps between the MAC logical channels and MAC transport channels. The 5GNR MAC exchanges the SDAP data and RRC signaling with the 5GNR PHY over the MAC transport channels. The 5GNR PHY maps between the MAC transport channels and PHY transport channels. The 5GNR PHY exchanges the SDAP data and RRC signaling with PHYs in 5GNR/LTE UEs 501 over the PHY transport channels and 5GNR DU circuitry 721.

In CU circuitry 723, the LTE RRC maps between S1-U data and SDUs. The LTE RRC maps between S1-MME signaling and SDUs. The LTE RRC exchanges the SDUs with the LTE PDCP. The LTE PDCP maps between the SDUs and Protocol Data Units (PDUs). The LTE PDCP exchange the PDUs with the LTE RLC. The LTE RLC maps between the PDUs and MAC logical channels. The LTE RLC exchanges the RRC data and RRC signaling with the LTE MAC over the MAC logical channels. The LTE MAC maps between the MAC logical channels and MAC transport channels. The LTE MAC exchanges the RRC data and RRC signaling with the LTE PHY over the MAC transport channels. The LTE PHY maps between the MAC transport channels and PHY transport channels. The LTE PHY exchange the RRC data and RRC signaling with PHYs in 5GNR/LTE UEs 501 over the PHY transport channels and LTE DU circuitry 722.

RRC functions comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

Figure 8:
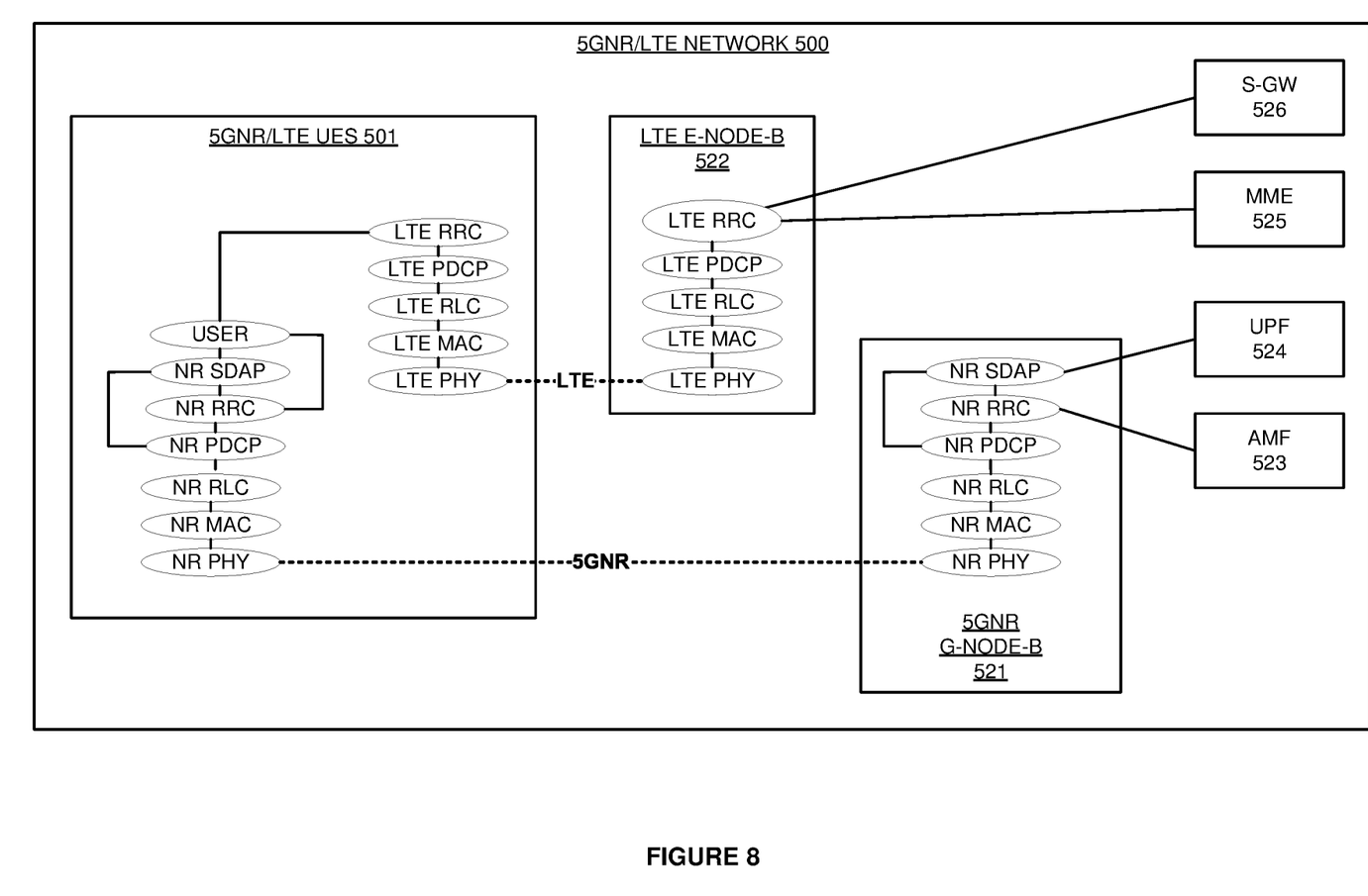
FIG. 8 illustrates the 5GNR/LTE communication network to serve the 5GNR/LTE UEs using MU-MIMO.

FIG. 8 illustrates 5GNR/LTE communication network 500 to serve 5GNR/LTE UEs 501 using MU-MIMO. In 5GNR gNodeB 521 and LTE eNodeB 522, the MACs receive geographic data that specifies geographic containers. The MACs will associate MU-MIMO correlation factors with the geographic containers.

In 5GNR/LTE UEs 501, the user applications exchange user data and user signaling with the 5GNR SDAP and RRC. The user applications also exchange user data and user signaling with the LTE RRC. The 5GNR RRC processes the user signaling and DL RRC signaling to generate UL RRC signaling. The 5GNR RRC transfers the UL RRC signaling to the 5GNR RRC in 5GNR gNodeB 521 over the 5GNR PDCP, RLC, MAC, and PHY layers. The 5GNR SDAP processes the user data to generate SDAP data. The 5GNR SDAP transfers the SDAP data to the 5GNR SDAP in 5GNR gNodeB 521 over the 5GNR PDCP, RLC, MAC, and PHY layers. The LTE RRC processes the user signaling and DL RRC signaling to generate UL RRC signaling. The LTE RRC process the user data to generate UL RRC data. The LTE RRC transfers the UL RRC signaling and the UL RRC data to the LTE RRC in LTE eNodeB 522 over the LTE PDCP, RLC, MAC, and PHY layers.

In 5GNR gNodeB 521, the 5GNR RRC exchanges N2 signaling with AMF 523. The 5GNR SDAP exchanges N3 data with UPF 524. The 5GNR RRC processes the DL N2 signaling and UL RRC signaling to generate DL RRC signaling and UL N2 signaling. The 5GNR RRC transfers the RRC signaling to the 5GNR RRC in 5GNR/LTE UEs 501 over the 5GNR PDCP, RLC, MAC, and PHY layers. The 5GNR SDAP processes the DL N3 data to generate DL SDAP data. The 5GNR SDAP transfers the SDAP data to the 5GNR SDAP in 5GNR/LTE UEs 501 over the 5GNR PDCP, RLC, MAC, and PHY layers. In LTE eNodeB 522, the LTE RRC exchanges S1-MME signaling with MME 525 and S1-U data with S-GW 526. The LTE RRC transfers the RRC signaling and RRC data to the LTE RRC in 5GNR/LTE UEs 501 over the LTE PDCP, RLC, MAC, and PHY layers.

The 5GNR RRC signaling from 5GNR/LTE UEs 501 carries SRS. In 5GNR gNodeB 521, the 5GNR PHY processes the SRS to determine radio metrics like AoA and received signal strength. The 5GNR MAC processes the radio metrics to determine 5GNR UE MU-MIMO correlation factors for groups of 5GNR/LTE UEs 501. The 5GNR MAC processes the radio metrics to determine UE locations for 5GNR/LTE UEs 501. The 5GNR MAC uses the UE MU-MIMO correlation factors to select and group UEs 501 for MU-MIMO. The 5GNR MAC schedules the selected 5GNR/LTE UEs 501 so that individual MU-MIMO groups share individual DL 5GNR resource blocks. The 5GNR PHY transfers DL 5GNR signals so that the individual MU-MIMO groups share individual DL 5GNR resource blocks. In 5GNR/LTE UEs 501, the 5GNR PHYs isolate their specific 5GNR signal from the other 5GNR signals in the shared 5GNR DL resource blocks.

In 5GNR gNodeB 521, the 5GNR MAC associates the UE MU-MIMO correlation factors with the geographic containers based on UE locations. The 5GNR MAC averages the UE MU-MIMO correlation factors for individual groups of the geographic containers to determine container MU-MIMO correlation factors for the groups of geographic containers. When the sample size (the number of UE correlations) for a group of geographic containers reaches a threshold, the 5GNR MAC begins to select 5GNR/LTE UEs 501 for MU-MIMO based on the container MU-MIMO correlation factors for that group of geographic containers. The 5GNR MAC does not calculate UE correlation factors for the group of geographic containers until the sample size ages and needs to be refreshed. The 5GNR MAC schedules the selected 5GNR/LTE UEs 501 so that individual MU-MIMO groups share individual DL 5GNR resource blocks. The 5GNR PHY transfers DL 5GNR signals so that the individual MU-MIMO groups share individual DL 5GNR resource blocks.

The LTE RRC signaling from 5GNR/LTE UEs 501 carries SRS. In LTE eNodeB 522, the LTE PHY processes the SRS to determine radio metrics like AoA and received signal strength. The LTE MAC processes the radio metrics to determine LTE UE MU-MIMO correlation factors for groups of 5GNR/LTE UEs 501. The LTE MAC processes the radio metrics to determine UE locations for 5GNR/LTE UEs 501. The LTE MAC uses the UE MU-MIMO correlation factors to select and group 5GNR/LTE UEs 501 for MU-MIMO. The LTE MAC schedules the selected 5GNR/LTE UEs 501 so that individual MU-MIMO groups share individual DL LTE resource blocks. The LTE PHY transfers DL LTE signals so that the individual MU-MIMO groups share individual DL LTE resource blocks. In UEs 501, the LTE PHYs isolate their specific LTE signal from the other LTE signals in the shared DL LTE resource blocks.

In LTE eNodeB 522, the LTE MAC associates the UE MU-MIMO correlation factors with the geographic containers based on UE locations. The LTE MAC averages the UE MU-MIMO correlation factors for individual groups of the geographic containers to determine container MU-MIMO correlation factors for the groups of geographic containers. When the sample size (the number of UE correlations) for a group of geographic containers reaches a threshold, the LTE MAC begins to select 5GNR/LTE UEs 501 for MU-MIMO based on the container MU-MIMO correlation factors for that group of geographic containers. The LTE MAC does not calculate UE correlation factors for the group of geographic containers until the sample size ages and needs to be refreshed. The LTE MAC schedules the selected 5GNR/LTE UEs 501 so that individual MU-MIMO groups share individual DL LTE resource blocks. The LTE PHY transfers DL LTE signals so that the individual MU-MIMO groups share individual DL LTE resource blocks.

The wireless data network circuitry described above comprises computer hardware and software that form special-purpose access node circuitry to efficiently group UEs for MU-MIMO using geographic container correlation factors. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose access node circuitry to efficiently group UEs for MU-MIMO using correlation factors for geographic containers.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to share a wireless resource block that comprises a same time interval and a same radio subcarrier, the method comprising:
   for a first set of User Equipment (UEs), determining first UE locations, determining UE correlation factors between the first set of the UEs based on the first UE locations, associating the UE correlation factors with Three-Dimensional (3D) geographic containers based on the first UE locations, and generating container correlation factors for the Three-Dimensional (3D) geographic containers responsive to the associations;
   for a second set of the UEs, determining second UE locations, identifying the 3D geographic containers for the second set of the UEs based on the second locations, determining the container correlation factors for the identified 3D geographic containers, selecting some of the second set of the UEs for the shared wireless resource block based on the container correlation factors for the identified 3D geographic containers; and
   wirelessly transferring user data to the selected ones of the second set of the UEs over the shared wireless resource block that comprises the same time interval and the same radio subcarrier for each of the selected ones of the second set of the UEs.

2. The method of claim 1 wherein determining the container correlation factors comprises averaging the UE correlation factors.

3. The method of claim 1 wherein determining the UE correlation factors comprises determining directions-of-arrival for the first set of the UEs.

4. The method of claim 1 wherein determining the UE correlation factors comprises identifying signal strengths for the first set of the UEs.

5. The method of claim 1 wherein some of the 3D geographic containers are located above other ones of the 3D geographic containers.

6. The method of claim 1 wherein the 3D geographic containers comprise 3D volumes that are each smaller than 100 meters by 100 meters by 100 meters.

7. The method of claim 1 wherein the wireless communication network determining the UE locations, determining the UE correlation factors, associating the UE correlation factors, and generating the container correlation factors comprises a Fifth Generation New Radio (5GNR) access node determining the UE locations, determining the UE correlation factors, associating the UE correlation factors, and generating the container correlation factors.

8. The method of claim 1 wherein the wireless communication network determining the UE locations, determining the UE correlation factors, associating the UE correlation factors, and generating the container correlation factors comprises a Long-Term Evolution (LTE) access node determining the UE locations, determining the UE correlation factors, associating the UE correlation factors, and generating the container correlation factors.

9. The method of claim 1 wherein selecting some of the second set of the UEs for the shared wireless resource block based on the container correlation factors comprises selecting some of the second set of the UEs without determining UE correlation factors for the second set of the UEs.

10. The method of claim 1 wherein wirelessly transferring the user data to the selected ones of the second set of the UEs over the shared wireless resource block comprises using Multi-User Multiple Input Multiple Output (MU-MIMO).

11. A wireless communication network configured to share a wireless resource block that comprises a same time interval and a same radio subcarrier, the wireless communication network comprising:
    network circuitry configured to, for a first set of User Equipment (UEs), determine first UE locations, determine UE correlation factors between the first set of the UEs based on the first UE locations, associate the UE correlation factors with Three-Dimensional (3D) geographic containers based on the first UE locations, and generate container correlation factors for the Three-Dimensional (3D) geographic containers responsive to the associations;
    the network circuitry configured to, for a second set of UEs, determine second UE locations, identify the 3D geographic containers for the second set of the UEs based on the second UE locations, determine the container correlation factors for the identified 3D geographic containers, select some of the second set of the UEs for the shared wireless resource block based on the container correlation factors for the identified 3D geographic containers; and
    transceiver circuitry configured to wirelessly transfer user data to the selected ones of the second set of the UEs over the shared wireless resource block that comprises the same time interval and the same radio subcarrier for each of the selected ones of the second set of the UEs.

12. The wireless communication network of claim 11 wherein the network circuitry configured to determine the container correlation factors comprises the network circuitry configured to average the UE correlation factors.

13. The wireless communication network of claim 11 wherein the network circuitry configured to determine the UE correlation factors comprises the network circuitry configured to determine directions-of-arrival for the first set of the UEs.

14. The wireless communication network of claim 11 wherein the network circuitry configured to determine the UE correlation factors comprises the network circuitry configured to identify signal strengths for the first set of the UEs.

15. The wireless communication network of claim 11 wherein some of the 3D geographic containers are located above other ones of the 3D geographic containers.

16. The wireless communication network of claim 11 wherein the 3D geographic containers comprise 3D volumes that are each smaller than 100 meters by 100 meters by 100 meters.

17. The wireless communication network of claim 11 wherein the network circuitry configured to determine the UE locations, determine the UE correlation factors, associate the UE correlation factors, and generate the container correlation factors comprises a Fifth Generation New Radio (5GNR) access node configured to determine the UE locations, determine the UE correlation factors, associate the UE correlation factors, and generate the container correlation factors.

18. The wireless communication network of claim 11 wherein the network circuitry configured to determine the UE locations, determine the UE correlation factors, associate the UE correlation factors, and generate the container correlation factors comprises a Long-Term Evolution (LTE) access node configured to determine the UE locations, determine the UE correlation factors, associate the UE correlation factors, and generate the container correlation factors.

19. The wireless communication network of claim 11 wherein the network circuitry configured to select some of the second set of the UEs for the shared wireless resource block based on the container correlation factors comprises the network circuitry configured to select some of the second set of the UEs without determining UE correlation factors for the second set of the UEs.

20. The wireless communication network of claim 11 wherein the transceiver circuitry configured to wirelessly transfer the user data to the selected ones of the second set of the UEs over the shared wireless resource block comprises the transceiver circuitry configured to use Multi-User Multiple Input Multiple Output (MU-MIMO).

* * * * *